US012653109B2

(12) United States Patent
Quast

(10) Patent No.: US 12,653,109 B2
(45) Date of Patent: Jun. 16, 2026

(54) BINDING APPARATUS FOR A BALING PRESS

(71) Applicant: Maschinenfabrik Bernard Krone GmbH & Co. KG, Spelle (DE)

(72) Inventor: David Quast, Rheine (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 323 days.

(21) Appl. No.: 18/357,698

(22) Filed: Jul. 24, 2023

(65) Prior Publication Data

US 2024/0023489 A1 Jan. 25, 2024

(30) Foreign Application Priority Data

Jul. 25, 2022 (DE) .......................... 102022118534.6

(51) Int. Cl.
| | |
|---|---|
| *A01F 15/14* | (2006.01) |
| *A01F 15/02* | (2006.01) |
| *B30B 9/30* | (2006.01) |
| *B65B 27/12* | (2006.01) |

(52) U.S. Cl.
CPC .............. *A01F 15/14* (2013.01); *A01F 15/02* (2013.01); *B30B 9/3003* (2013.01); *B65B 27/12* (2013.01)

(58) Field of Classification Search
CPC ........ A01F 15/02; A01F 15/14; B30B 9/3003; B65B 27/12
See application file for complete search history.

(56) References Cited

U.S. PATENT DOCUMENTS

| | | | |
|---|---|---|---|
| 2,403,396 A | * | 7/1946 | Raney ................... A01F 15/145 |
| | | | 100/19 A |
| 2,766,684 A | | 10/1956 | Newmaster et al. |
| 2,897,749 A | | 8/1959 | Wilhelm et al. |
| 3,122,991 A | | 3/1964 | Grillot |
| 4,062,280 A | | 12/1977 | Ankenman et al. |

FOREIGN PATENT DOCUMENTS

| | | | |
|---|---|---|---|
| DE | 1157024 B | 11/1963 | |
| EP | 2978301 B1 | * 12/2017 | ......... A01F 15/0841 |

* cited by examiner

*Primary Examiner* — Jimmy T Nguyen
(74) *Attorney, Agent, or Firm* — McKee, Voorhees & Sease, PLC

(57) ABSTRACT

A binding apparatus (10) for a baling press (1), having a needle rocker (11) having a plurality of binding needles (12) for supplying binding to a pressing channel (3), wherein the needle rocker (11) can be driven by a motorized drive (40) in such a manner that it moves relative to a frame (2) of the baling press (1) in accordance with a binding cycle, and having a brake apparatus (15) which is configured to apply a braking force (F) which acts at least indirectly on the needle rocker (11). In order to enable an efficient and precise guiding of a needle rocker, there is provision, according to the invention, for the binding apparatus (10) to be configured in such a manner that the braking force (F) is automatically varied in accordance with at least one parameter relating to the binding apparatus (10).

12 Claims, 5 Drawing Sheets

BINDING APPARATUS FOR A BALING PRESS

CROSS REFERENCE TO RELATED APPLICATIONS

This application claims priority under 35 U.S.C. § 119 to German Patent Application DE 10 2022 118 534.6, filed Jul. 25, 2022, which is herein incorporated by reference in its entirety, including without limitation, the specification, claims, and abstract, as well as any figures, tables, appendices, or drawings thereof.

FIELD OF THE INVENTION

The present invention is a binding apparatus for a baling press.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

Baling presses are used in agriculture to press harvested material, such as, for example, hay or straw, which has been picked up beforehand into bales. The harvested material is normally picked up from the ground by a pick-up, which is integrated in the baling press. In the case of a square baler, the pressing of the collected harvested material is carried out in two steps. Firstly, the harvested material which has been taken by the pick-up and where applicable cut by a cutting apparatus is conveyed further by a conveying apparatus or collection apparatus within a collection chamber and in this instance piled or precompressed. A pressing chamber or a pressing channel is arranged downstream of the collection chamber. An oscillating pressing piston acts at that location on the harvested material and carries out the actual pressing. Precompressed harvested material is consequently moved in portions into the pressing channel, where a successive build-up of the square bale is carried out.

When the square bale has reached a predetermined size, it is bound by means of a binding material or binding means before it is ejected. The binding material may, for example, be a yarn or a thermoplastic strip. During the binding operation, an end region of the binding means is secured to one end of the bale at the upper side thereof, wherein the binding means strand is guided back along the upper side to the opposing end, then in a downward direction and subsequently in the opposite direction below the bale. An adjacent portion of the binding means strand is guided by a binding needle. In this instance, a plurality of binding needles are secured to a needle rocker, which is movably arranged opposite the pressing channel. It may, in particular, be moved from a position outside the pressing channel into a position, in which the binding needles project upwards into the pressing channel, wherein each binding needle carries a binding means strand. This strand can be connected to the secured end region, either by means of knotting or welding, whereby a closed loop is formed around the bale. This loop can be separated from the remaining binding means strand, wherein, in turn, a newly produced end region is secured. The bale can be ejected, and a new bale formation operation can begin.

The generally existing requirements for a high process speed lead to a rapid movement of the needle rocker.

Although it can be readily implemented in technical driving terms, it involves the risk of the needle rocker moving in an undesirable manner beyond an intended end position, that is to say, to some degree overswinging, which could lead to damage to the needle rocker and/or other components. It is therefore known in the prior art to use a brake apparatus, which applies a permanent braking force to the needle rocker. This can prevent overswinging, but increases the loading of the drive. Furthermore, a brake apparatus which is configured for high drive speed may lead to the needle rocker at a low drive speed no longer being able to reach the intended end positions thereof. In order to prevent this, the drive power has to be increased, which in turn may require an increase of the braking force. On the whole, therefore, a considerable degree of drive energy, which is not converted into movement energy of the needle rocker, but instead is lost on the brake apparatus is required. Furthermore, the loading of the brake apparatus leads to increased wear.

Therefore, there is a strong need to have an efficient and precise guiding of a needle rocker.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

A feature of the present disclosure is a binding apparatus (10) for a baling press (1) that includes a needle rocker (11) having a plurality of binding needles (12) for supplying a binding means to a pressing channel (3), wherein the needle rocker (11) can be driven by means of a motorized drive (40) in such a manner that it moves relative to a frame (2) of the baling press (1) in accordance with a binding cycle; and a brake apparatus (15) which is configured to apply a braking force (F) which acts at least indirectly on the needle rocker (11), wherein the binding apparatus (10) is configured in such a manner that the braking force (F) is automatically varied in accordance with at least one parameter relating to the binding apparatus (10).

To this end, a binding apparatus for a baling press is provided, having a needle rocker having a plurality of binding needles for supplying a binding means to a pressing channel, wherein the needle rocker can be driven by means of a motorized drive in such a manner that it moves relative to a frame of the baling press in accordance with a binding cycle, and having a brake apparatus which is configured to apply a braking force which acts at least indirectly on the needle rocker.

The baling press is normally a square baler or a large baler. The baling press may be constructed to be self-driving with its own travel drive or as a trailer without an individual travel drive. It has a pressing channel in which the actual bale formation and the pressing operation are carried out. The pressing channel has a longitudinal channel axis, with which it normally extends in a primarily parallel manner. The longitudinal channel axis may correspond to a longitudinal axis of the baling press, but it may also be inclined relative thereto. Typically, there is arranged in the pressing channel a pressing piston, which is configured to act on the harvested material by means of an oscillating movement and thus to press it. With regard to the harvested material flow, there is generally arranged upstream of the pressing channel a collection chamber in which a conveying apparatus or collection apparatus is configured to convey the harvested material further and to precompress it.

In order to secure the shape of the completed bale, it is provided with a binding means inside the pressing channel. The binding means, which can also be referred to as a binding material, may be a yarn or a thermoplastic strip (for example, made of PET). It is normally laid around the bale in a plurality of separate loops, which are spaced apart transversely relative to the longitudinal channel axis. In order to form the respective loop, an end region of the binding means which is secured to an end of the bale is connected to a portion, which to this end, has to be guided from the outer side into the pressing channel. In order to guide the respective portion into the pressing channel, a binding needle is provided in each case. A needle rocker has, in this instance, a plurality of binding needles which can, for example, be secured to a common carrier. The number of binding needles on the needle rocker is, in principle, not limited but may typically be between two and eight. Each of the binding needles guides binding means into the pressing channel, wherein the supply is normally carried out from a lower side of the pressing channel. The needle rocker is part of the binding apparatus according to the invention, wherein the binding apparatus may generally have components that are directly linked to the binding operation, but also components that are not involved or only indirectly involved in the binding operation. The term "binding apparatus" is thus not intended to be interpreted to be limiting. The needle rocker can be driven by means of a motorized drive in such a manner that it moves in accordance with a binding cycle relative to a frame of the baling press. The motorized drive has at least one motor which may, for example, be in the form of an internal combustion engine, an electric motor, a hydraulic motor, or in another manner. Typically, precisely one motor is provided so that the motorized drive can also be referred to as a motor.

The needle rocker can be driven by the motorized drive, wherein it is generally not coupled directly to the respective motor, but instead by means of different elements for force transmission and/or redirection and where applicable for stepping up or stepping down. In particular, there may also be provision for the needle rocker to be able to be temporarily uncoupled from the drive. The needle rocker is movably supported with respect to a frame of the baling press, wherein it can normally be pivoted about a rocker pivot axis, which extends in the transverse direction of the baling press. As result of the action of the motorized drive, the needle rocker moves according to a binding cycle. This binding cycle normally corresponds to a movement from a starting position, which corresponds to a first dead center position into a binding position, which corresponds to a second dead center position, followed by a movement back into the starting position. In the binding position, the binding needles are introduced to the greatest possible extent into the pressing channel. With the conventional arrangement of the needle rocker, the first dead center position is a bottom dead center position, and the second dead center position is a top dead center position.

The movement of the needle rocker within the binding cycle has different acceleration phases and deceleration phases. The necessary deceleration forces may be partially absorbed, for example, by the motorized drive, but this is generally not sufficient. The binding apparatus, therefore, has a brake apparatus that is configured to apply a force which acts at least indirectly on the needle rocker. Normally, the braking force is produced by means of solid state friction, although a production by means of a fluid friction or eddy currents is at least additionally conceivable. The brake apparatus may apply a braking force either directly to the needle rocker so that the braking force acts directly on the needle rocker. Alternatively, the braking force may act indirectly on the needle rocker, which means that the braking force is produced on a component which is rigidly connected to the needle rocker, or the movement thereof is at least forcibly coupled to the movement of the needle rocker so that a braking force acting on the corresponding component necessarily also acts on the needle rocker. Generally, it can also be said that the brake apparatus is configured to apply a braking force which brakes the needle rocker. The brake apparatus may have a single brake or a plurality of brakes.

According to the invention, the binding apparatus is configured in such a manner that the braking force is automatically varied in accordance with at least one parameter relating to the binding apparatus. Normally, this is a parameter which describes the current operating state of the binding apparatus. It may, in this instance, generally be a position, a speed, an acceleration, a power or another variable. The braking force is thus, according to the invention, not constantly maintained but is instead dependent on the at least one parameter. When the parameter changes, automatically, a change of the braking force is carried out in accordance therewith. In this instance, it may be the case that in specific value ranges of the parameter, there is no change in the braking force. There is, however, at least one parameter range in which a corresponding change results. The strength of the necessary braking force is generally dependent exclusively on parameters which relate to the binding apparatus itself. A variation of the braking force in accordance with requirements should be based on at least one such parameter. It is thereby possible to control the braking force with regard to the temporal action thereof and/or the strength thereof in such a manner that an unnecessary braking or an unnecessarily powerful braking is prevented.

Consequently, the invention enables safe operation of the binding apparatus, wherein wear and energy requirement are minimized. Nonetheless, undesirable operations, such as, for example, a movement out beyond a provided dead center position, can effectively be prevented. The needle rocker may, for example, also be secured in the bottom dead center position thereof so that it remains reliably in one position between two binding cycles. Otherwise, it could, for example, move under the influence of gravitational force, whereby, for example, a coupling to the drive during the next binding cycle could become impossible, or the binding needles could protrude between the binding cycles into the pressing channel.

With regard to the generation of the braking force, there are no limitations in the context of the invention. For example, it could be produced by means of an electrical or pneumatic actuator. It would also be conceivable for the braking force to be produced by means of a resilient element, wherein, as a result of a suitable mechanism, the pretensioning of the resilient element is varied in accordance with the at least one parameter. A preferred embodiment makes provision for the brake apparatus to be able to be actuated hydraulically. That is to say, the brake apparatus has at least one hydraulic actuator by means of which the braking force is produced. In a variant, it would, for example, also be conceivable for the braking force to be produced by means of a resilient element, wherein, however, a hydraulic actuator acts counter to the resilient element, in order to reduce or completely be able to deactivate the braking force.

A preferred embodiment makes provision for the binding apparatus to be configured in such a manner that the braking force is varied in accordance with a phase of the binding cycle. The respective phase of the binding cycle corresponds, on the one hand, to a time during the binding cycle and, on the other hand, to a position and a movement state of the needle rocker. It is also possible to refer to a movement phase of the needle rocker within the binding cycle. If, as described below, the needle rocker is coupled to a control shaft, the phase further corresponds to a current rotation angle of the control shaft. In any case, the variation in accordance with the phase of the binding cycle means that the braking force is varied during the binding cycle. Accordingly, it can be adapted to the respective requirements, in particular depending on whether and how significantly the needle rocker is intended to be braked in a specific movement phase.

Generally, the binding apparatus is configured to introduce at least one time-limited braking phase, to increase the braking force for the at least one braking phase, and to reduce the braking force after the braking phase. Since the binding apparatus during normal operation passes through a plurality of binding cycles one after the other, between which a bale formation is carried out in each case, a plurality of braking phases are produced, that is to say, at least one braking phase per binding cycle. In particular, a number of braking phases per binding cycle may be provided. In comparison with the phase prior to the respective braking phase, which can generally be referred to as an intermediate phase, the braking force for the braking phases is increased. This includes the possibility of the braking force previously being zero. During the braking phase, the braking force is maintained, but does not necessarily have to be constant. In any case, the braking force is reduced after the braking phase. This again includes the possibility of the braking force being reduced to zero. Typically, the braking force after the braking phase is reduced to the value that it had prior to the braking phase, but this is not necessarily the case. The respective braking phase corresponds to a time range. However, it generally also corresponds to a position range of the needle rocker. That is to say, the braking phase lasts as long as the position of the needle rocker is in a specific range or region.

In most cases, the application of a braking force after the braking phase is rather counter-productive and leads only to unnecessary wear of the brake apparatus. The binding apparatus is, therefore, preferably configured to activate the braking force for at least one braking phase and to reduce the braking force to zero after the braking phase. Consequently, the brake apparatus is completely deactivated between two braking phases. The corresponding intermediate phase may, in this instance, also be referred to as the free-wheeling phase. Only for the next braking phase is the braking force increased to a positive value again. In this instance, it is possible for the braking force to be reduced continuously after the braking phase, that is to say, gradually. Alternatively, it is also possible for the braking force to be reduced to zero in a discontinuous manner so that the braking force falls to zero in steps.

Preferably, the binding apparatus is configured to introduce at least one braking phase before a dead center position of the needle rocker is reached and to terminate it at the latest after the dead center position has been reached. The dead center position refers, in this instance, to a position or location in which the needle rocker is intentionally stationary and is subjected to a reversal of the movement direction. Normally, it is possible to identify a top dead center position in which the binding needles protrude furthest into the pressing channel and protrude partially through the pressing channel, and a bottom dead center position in which the binding needles are retracted completely out of the pressing channel. However, movement sequences of the needle rocker are conceivable in which it is possible to identify more than the two dead center positions mentioned. For example, the needle rocker could be moved out of the bottom dead center position into the top dead center position, then into the bottom dead center position again, and from there into a central dead center position. Other movement sequences are also conceivable. In the embodiment described in this instance, a braking phase is introduced before reaching a dead center position; that is to say, the braking force is increased or, where applicable, activated so that the needle rocker is effectively braked. An overswing beyond the dead center position can thus be prevented. Where applicable, the braking phase can already be terminated before reaching the dead center position, for example, in a state in which the needle rocker is braked to such an extent that further braking is not required. At the latest, after reaching the dead center position, it is advantageous to terminate the braking phase. In particular, the braking phase should be terminated when the needle rocker moves out of the dead center position again. At this time, the needle rocker is accelerated, which is intended to be supported by means of a reduction or a deactivation of the braking force. Typically, on the whole, one braking phase per dead center position can be provided during a binding cycle.

Advantageously, the brake apparatus may be coupled by means of a coupling mechanism to a control shaft, which can be rotated relative to the frame and via which the needle rocker is coupled in a force-transmitting manner to the drive, at least during a binding cycle. The coupling mechanism may have, for example, elements for mechanical force transmission, elements for actuator force production, sensors and/or wireless or wired signal transmission paths. In any case, the coupling mechanism is constructed in such a manner that the braking force is dependent on a rotation angle of the control shaft. In other words, the control shaft controls via the rotation angle thereof the development of the braking force. Although other variants are also conceivable, the control shaft normally rotates through 360° during a binding cycle. At least during the binding cycle, the needle rocker is coupled in a force-transmitting manner to the motorized drive by means of the control shaft. Generally, a permanent mechanical connection between the needle rocker and the control shaft is produced, for example, by means of a rod assembly, by means of which the rotational movement of the control shaft is converted into an oscillating pivot movement of the needle rocker.

In contrast, between the control shaft and the motorized drive, a coupling is generally interposed so that a mechanical connection can be produced during the binding cycle and released after the binding cycle is complete. In this embodiment, therefore, both the brake apparatus and the needle rocker are coupled to the control shaft during the binding cycle, and consequently, the braking force is automatically synchronized with the movements of the needle rocker. That is to say, there is automatically a variation of the braking force in accordance with the phase of the binding cycle.

According to one embodiment, the coupling mechanism has a curved path which is connected in a rotationally secure manner to the control shaft, and a sensor element which can be deflected by means of the curved path with respect to the frame and as a result of the deflection of which the braking force can be varied. The curved path is normally connected to the control shaft, at least in a rotationally secure, normally rigid manner. In principle, it would also be conceivable for the curved path to be coupled to the control shaft by means of intermediate gear mechanism components, which would, however, generally mean increased complexity without significant advantages. As a result of the coupling to the control shaft, on the one hand, a precise synchronization between the change of the braking force and the binding cycle of the needle rocker is ensured. On the other hand, the curved path may form the entire path of the braking force during the binding cycle without regions being unnecessarily repeated. The curved path may form the outer contour of a disc, which is connected to the control shaft. In this instance, the sensor element may abut from the outer side against the curved path, wherein it may be pretensioned by means of a resilient element in the direction towards the curved path. The curved path could, however, for example, also be formed by a groove in which the sensor element engages, or by means of a web on which the sensor element engages. In any case, the curved path has radially protruding regions and radially recessed regions, whereby the sensor element is deflected differently. The sensor element may be displaceably and/or pivotably connected to the frame. As a result of the deflection of the sensor element, the braking force can be varied. Normally, in this instance, a specific deflection of the sensor element corresponds to a specific braking force. However, it would also be conceivable for the braking force to be dependent on the deflection only in a specific range and, when this range is exceeded, for there to be no further change to the braking force. Generally, the sensor element is coupled to the brake apparatus, wherein the coupling generally does not necessarily have to be force-transmitting. It would, for example, also be conceivable to detect the deflection of the sensor element by means of a sensor, by means of the signal of which an actuator of the brake apparatus is, in turn, controlled.

A preferred embodiment makes provision for the sensor element to cooperate with a hydraulic valve, by means of which the brake apparatus can be actuated. Consequently, a deflection of the sensor element brings about a change of the state of the hydraulic valve. The hydraulic valve may be in the form of a directional control valve, wherein specific connections are opened or closed by means of the action of the sensor element. However, it is also conceivable for the hydraulic valve to be opened to different extents depending on the deflection of the sensor element. The brake apparatus can be actuated by means of the hydraulic valve; that is to say, the braking force is dependent on the state of the hydraulic valve. For example, a hydraulic actuator, which is part of the brake apparatus, could be acted on with pressure when the hydraulic valve is opened. In place of a sensor element and a curved path, the rotation angle of the control shaft could also be detected by means of a sensor, and, depending on the rotation angle detected, a hydraulic valve could be electronically controlled. In another modification, the sensor element could also be coupled to a piston of a master cylinder of a hydraulic system so that, as a result of the deflection of the sensor element, a change of the hydraulic pressure is brought about directly. This, in turn, brings about a change of the braking force on a hydraulically actuatable brake apparatus.

If, in place of a hydraulic force production, a force production by means of a resilient element is selected, a mechanism that counteracts the resilient element or reduces the pretensioning thereof could be coupled to the curved path. In particular, a mechanical coupling could be provided. Such a mechanism could, however, also have a hydraulic actuator, which is coupled to the sensor element and the curved path in the manner described above.

It is further preferable for the binding apparatus to be configured in such a manner that the braking force is varied in accordance with a drive speed of the drive. This may preferably be carried out in addition to a variation of the braking force depending on the phase of the binding cycle. Normally, in this embodiment, a specific drive speed is clearly associated with a specific braking force, on condition that other parameters which may be relevant, such as the position of the needle rocker, are predetermined. In particular, a maximum possible braking force may be clearly dependent on the drive speed. The term "drive speed" refers generally to a variable which characterizes how quickly the motorized drive is operated. In particular, this may also be a speed of the drive, or where applicable an angular speed.

A preferred embodiment makes provision for the braking force to increase with increasing drive speed. A higher drive speed means that the binding cycle is carried out in a shorter time. Accordingly, the needle rocker has to move more quickly, which in turn requires higher acceleration and deceleration forces. In particular, there may be provision for the braking force to increase proportionally to the square of the drive speed.

In particular, there may be provision for a hydraulic pressure for actuating the brake apparatus to increase with increasing drive speed. A corresponding relationship is often seen in hydraulic systems. In particular, the hydraulic pressure may be quadratically dependent on the speed of the drive, that is to say, it is, in this instance, proportional to the square of the speed. In a hydraulically acting brake apparatus, the braking force is again normally proportional to the hydraulic pressure. That is to say, a braking force which is proportional to the square of the speed is produced. This means an optimum adaptation to the acceleration or deceleration forces, which increase with increasing drive speed, and which have to act on the needle rocker. This is because they are also proportional to the square of the drive speed, that is to say, normally to the square of the speed.

Preferably, the brake apparatus has a disc brake having a brake caliper which is suspended on the frame and having a brake disc which can be coupled at least in a force-transmitting manner to the needle rocker. In particular, the brake disc can be coupled to the needle rocker in a force-transmitting manner. That is to say, there may be a permanent coupling. The brake disk may be connected rigidly to the needle rocker or even be constructed integrally therewith. However, a movable connection would also be conceivable. The force-transmitting coupling means, in any case, that the movement of the brake disc is coupled to the movement of the needle rocker. This normally means that the needle rocker is stopped when the brake disc is stopped. The brake liners, which cooperate with the brake disc in order to produce the braking force, are, in turn, arranged on the brake caliper. They may particularly be activated by means of one or more brake pistons. The respective brake piston can preferably be hydraulically moved. It is expressly also possible for a plurality of brake calipers to be associated with a brake disc and/or for the brake apparatus to have a plurality of disc brakes.

Preferably, a brake liner that is arranged on the brake caliper can be moved with respect to the frame with at least one degree of freedom. The brake caliper is either not rigidly connected to the frame but is instead movably connected thereto, whereby the brake liner is also movable. Alternatively, the brake liner may also be movably arranged on the brake caliper. In this instance, the movability is generally limited to a specific movement freedom. The movability contains at least one degree of freedom. In this instance, this may be at least one translational degree of freedom and/or at least one rotational degree of freedom. In particular, both at least one translational and at least one rotational degree of freedom may be provided. The brake liner (or the entire brake caliper) may, within the above-mentioned movement freedom, either be freely movable or it may be able to be returned by means of a resilient restoring element into a rest position. In any case, the movable connection enables an adaptation to positional changes between the brake disc and the frame. These may be caused, for example, by deformations of different components, which are brought about, for example, by means of thermal expansion. If the brake liner were not able to adapt to the position changes, this could lead to an unplanned increase or decrease of the braking force, to an undesirable grinding of brake liners on the brake disc, etcetera.

The object is further achieved with a baling press. The baling press has a binding apparatus having a needle rocker having a plurality of binding needles for supplying a binding means to a pressing channel, wherein the needle rocker can be driven by means of a motorized drive in such a manner that it moves in accordance with a binding cycle relative to a frame of the baling press, and having a brake apparatus which is configured to apply a braking force which acts at least indirectly on the needle rocker.

According to the invention, the binding apparatus is configured in such a manner that the braking force is automatically varied in accordance with at least one parameter of the binding apparatus.

The terms mentioned have already been explained above with reference to the binding apparatus according to the invention and are therefore not explained again. Advantageous embodiments of the baling press according to the invention correspond to those of the binding apparatus according to the invention.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated. Further details and advantages of the invention can be found in the schematic figures described below.

The invention is described below with reference to Figures. The Figures or FIGS. are purely exemplary and do not limit the general notion of the invention. In the drawings.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated. The hereinafter elucidated features may also be an aspect of the invention individually or in combinations other than those shown or described, but always at least in combination with the features of the claims. Where appropriate, functionally equivalent parts are provided with identical reference numbers.

Figure 1:
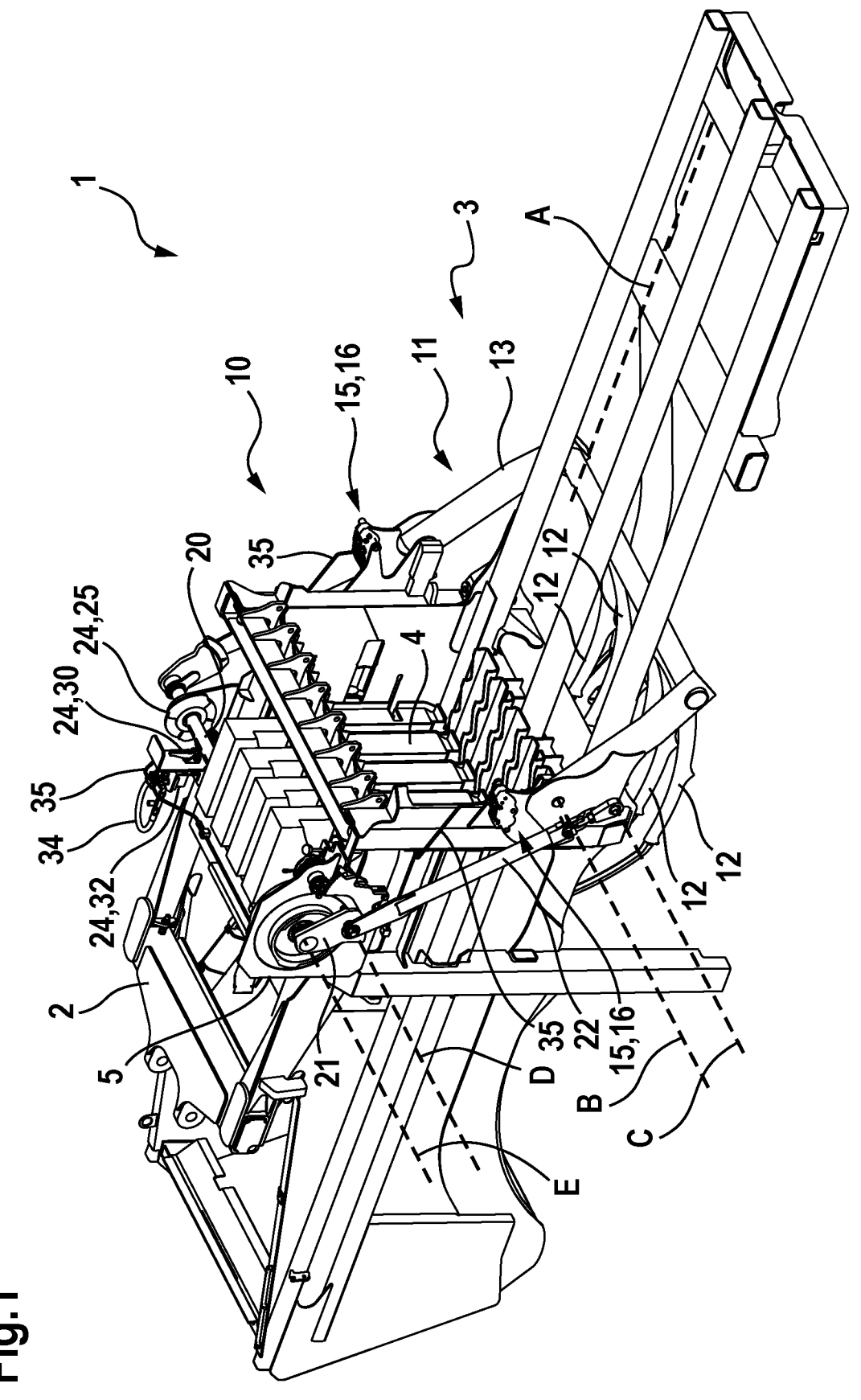
FIG. 1 shows a perspective illustration of a component of a baling press according to the invention.

FIG. 1 shows a perspective illustration of components of a baling press 1 according to the invention, more specifically a square baler. Different components which are not relevant to the understanding of the invention have been omitted, for example, a chassis and a drawbar by means of which the baling press 1 can be coupled to a towing vehicle. The invention is expressly not limited to pulled or carried baling presses, but instead also relates to self-driving baling presses. The baling press 1 has a frame 2. Inside the frame 2, there is defined a pressing channel 3, which extends along a longitudinal channel axis A. The lateral and upper cover of the pressing channel 3 is partially omitted in the Figure. Within the pressing channel 3, a square bale, which is not illustrated, is successively built up from portions of harvested material which have been precompressed in a collection chamber, which cannot be seen here. In this instance, the harvested material is compressed in the pressing channel 3 by means of an oscillating pressing piston 4. When the square bale has reached its predetermined size, it is bound together using a binding means, for example, a yarn or a thermoplastic strip. In this instance, a total of six loops of binding means, which are spaced apart from each other transversely relative to the longitudinal channel axis A are placed around the square bale. In order to form the respective loop, an end region of the binding means which is secured to an end of the bale at the upper side thereof is connected to a portion and, to this end, guided from below into the pressing channel.

Figure 2:
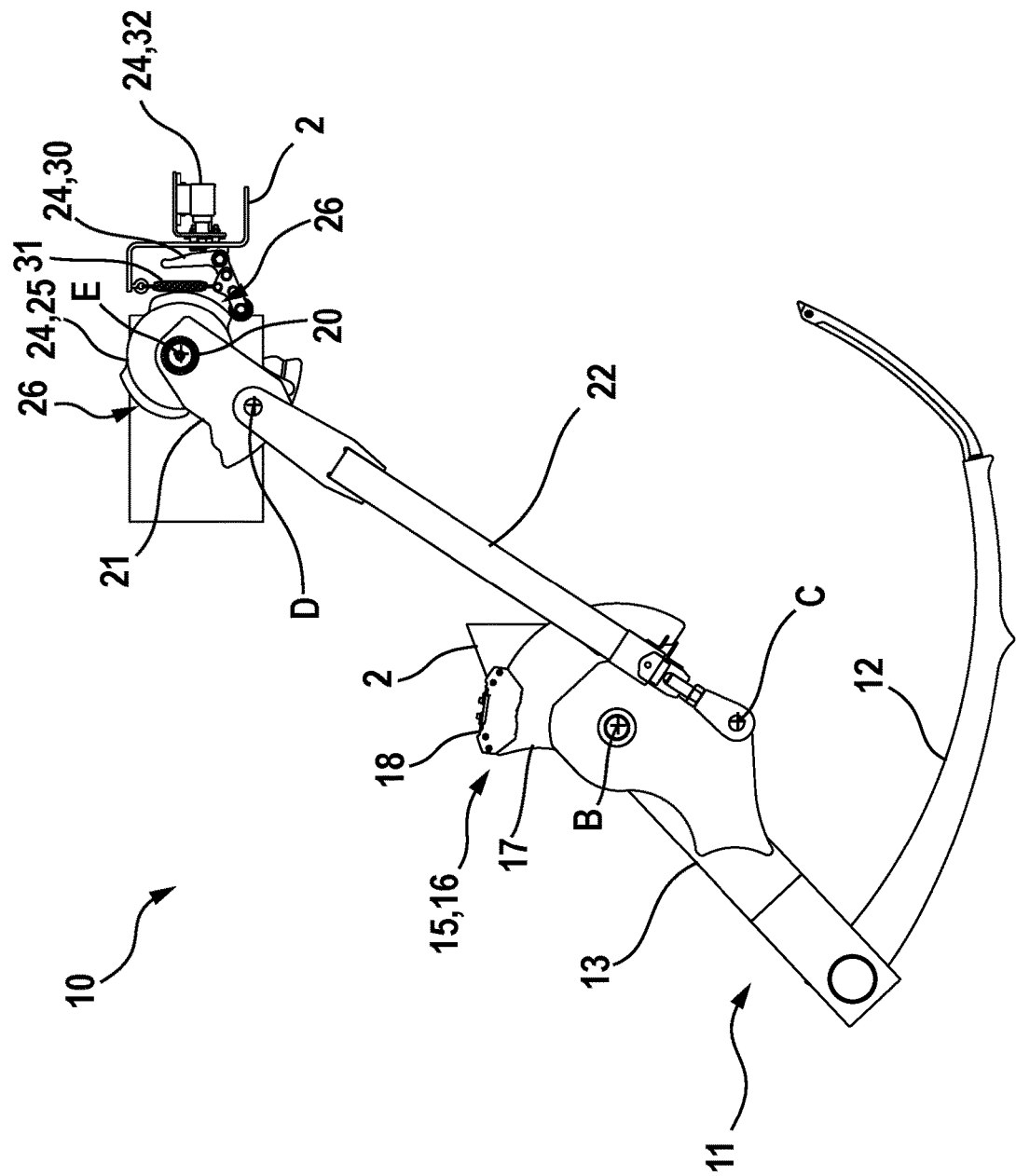
FIG. 2 shows a side view of a binding apparatus of the baling press from FIG. 1 in a first state.
Figure 3:
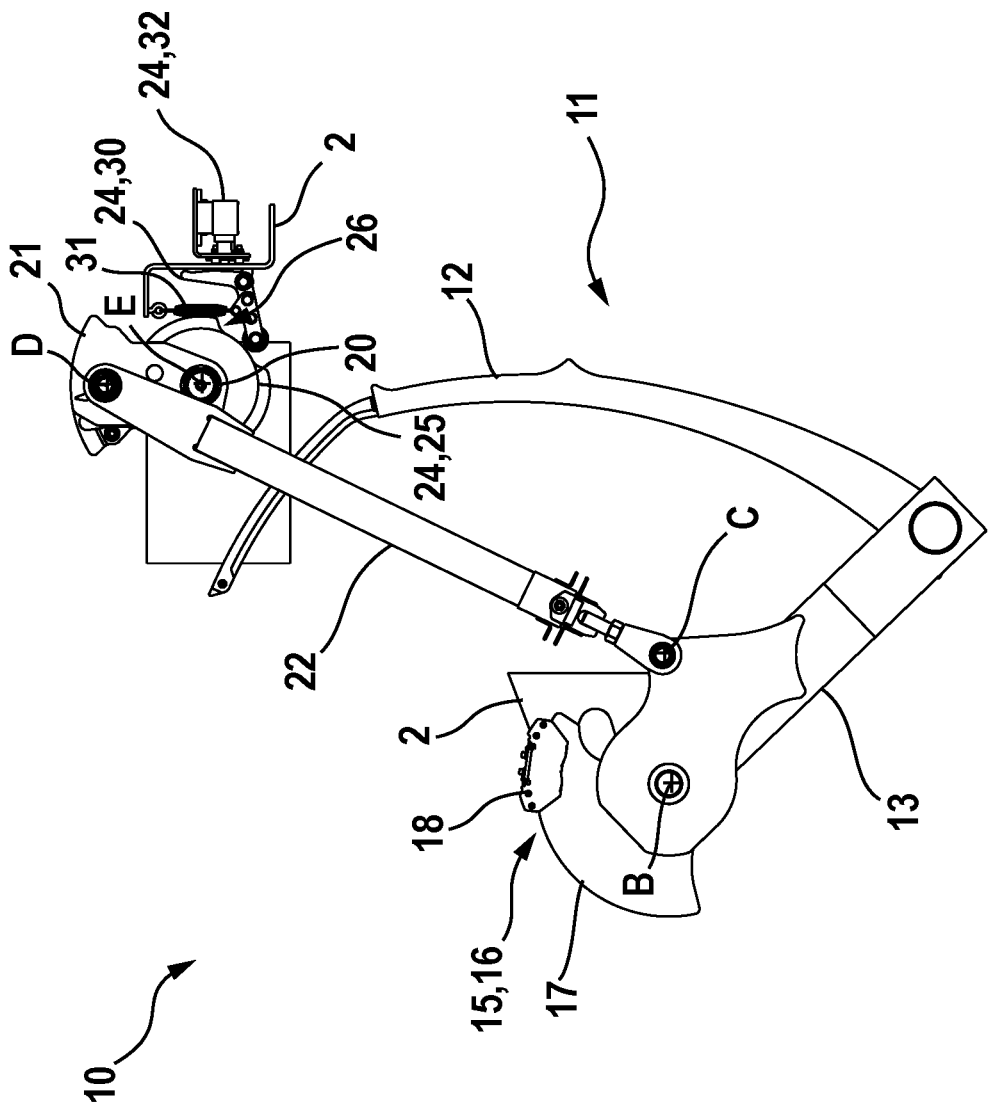
FIG. 3 shows a side view of the binding apparatus in a second state.

This is carried out using six binding needles 12, which are part of a needle rocker 11. The needle rocker 11 in turn, is part of a binding apparatus 10 according to the invention. The needle rocker 11 has a rocker carrier 13 to which the binding needles 12 are secured and which is connected to the frame 2 of the baling press 1 so as to be able to be pivoted about a rocker pivot axis B. Eccentrically with respect to the rocker pivot axis B, via a first coupling pivot axis C, a coupling rod 22 acts on the rocker carrier 13. This coupling rod 22 is at the opposing end thereof pivotably connected by means of a second coupling pivot axis D to a drive element 21, which in turn is connected to a control shaft 20 in a rotationally secure manner. The control shaft 20 may be connected by means of a coupling gear mechanism 5 to a motorized drive 40 (schematically illustrated in FIG. 4, so that it rotates about a shaft rotation axis E and the needle rocker 11 is driven for a binding cycle. In this instance, the needle rocker 11 is initially in a bottom dead center position in which the coupling pivot axes C, D and the shaft rotation axis E are located according to FIGS. 1 and 2 in a plane and the binding needles 12 are arranged completely outside the pressing channel 2. From this bottom dead center position the needle rocker 11 is moved into a top dead center position in which again the coupling pivot axes C, D and the shaft rotation axis E are located in a plane, but with the shaft rotation axis E being arranged between the coupling pivot axes C, D. FIG. 3 illustrates a state shortly before reaching the top dead center position. In the top dead center position, the binding needles 12 protrude into the pressing channel 3 and partially in an upward direction beyond it, wherein they also carry the above-mentioned portion of the binding means. This portion is connected to the end region of the binding means in order to form the loops, and the binding material is separated. These processes are not discussed in detail here. As a result of the mass or the moment of inertia of the needle rocker 11 and the sometimes short cycle times and resultant high speeds of the needle rocker 11, considerable forces are required in order to bring them to a standstill as intended in the respective dead center position. To this end, the binding apparatus 10 has a brake apparatus 15, which in this instance has two disc brakes 16, which are arranged at opposing sides of the pressing channel 3. Each of the disc brakes 16 has a brake disc 17, which is rigidly connected to the rocker carrier 13, and a brake caliper 18, which is connected to the frame 2. A brake liner, which is not visible in the Figures, is connected to the brake caliper 18 in such a manner that it can carry out within given limits both a translation and a rotation relative to the frame 2. It is consequently possible to prevent deformations which may occur during the production of the baling pressor during the operation thereof from influencing the action of the respective disc brake 16 in an unforeseeable manner.

Figure 4:
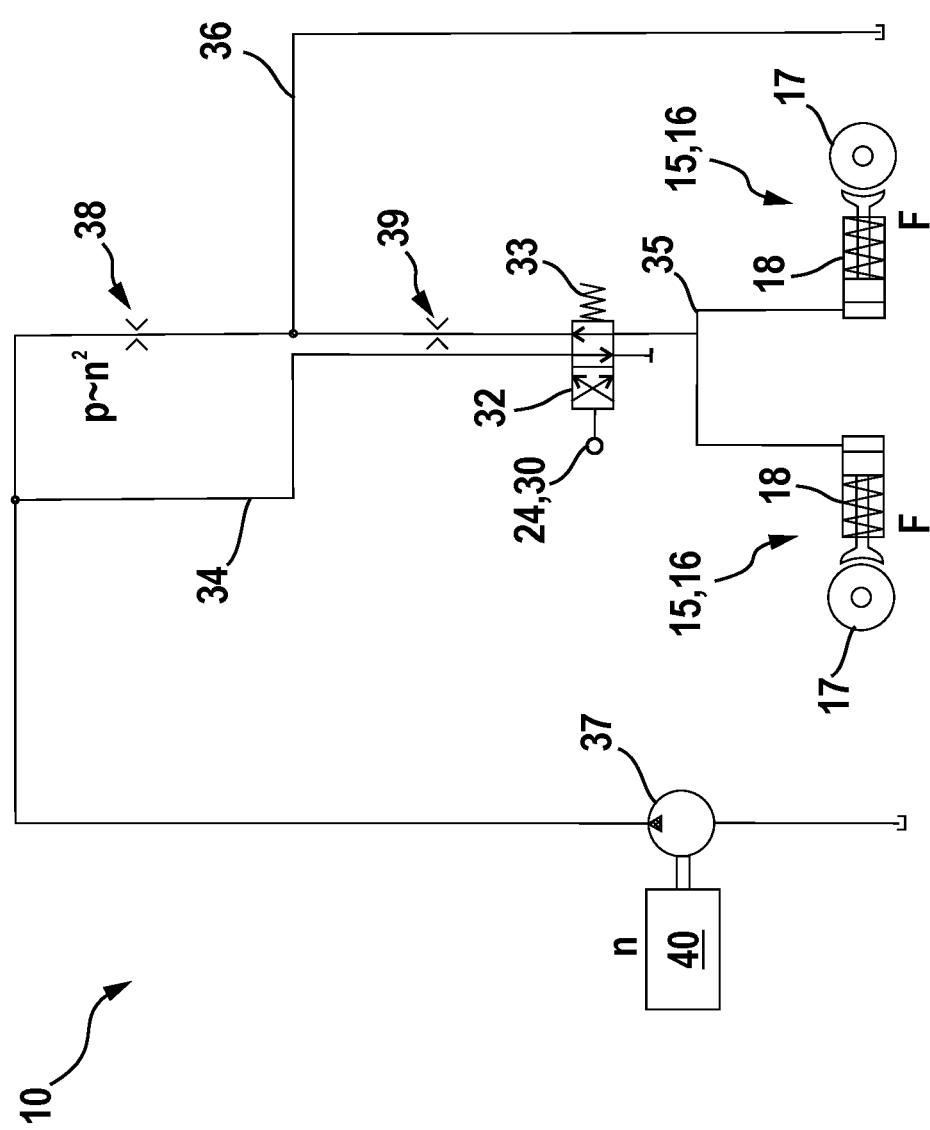
FIG. 4 shows a diagrammatic illustration of portions of the binding apparatus.

The brake discs 16 are connected by means of a dividing brake line 35 to a directional control valve 32. As can be seen in particular in FIGS. 2 and 3, there is associated with the directional control valve 32, a sensor element 30, which is pivotably arranged on the frame 2. The sensor element 30 is pretensioned by means of a first resilient element 31 in the direction towards a rest position in which it acts on the directional control valve 32 so that it connects the brake line 35 to a main line 34. As can be seen in the schematic illustration in FIG. 4, the directional control valve 32 is pretensioned by means of a second resilient element 33 into a position in which it isolates the brake line 35 from the main line 34 and connects it to a return line 36. The main line 34 is connected to a pump 37, which is coupled to the drive 40, which drives the needler rocker 11 during the binding cycle. By means of a primary throttle 38, there is produced in the main line 34 pressure p, which is proportional to the square of a speed n of the drive 40. If the brake line 35 is separated from the main line 34, the disc brakes 16 remain released. Such a state is shown in FIGS. 2 and 4.

Figure 5:
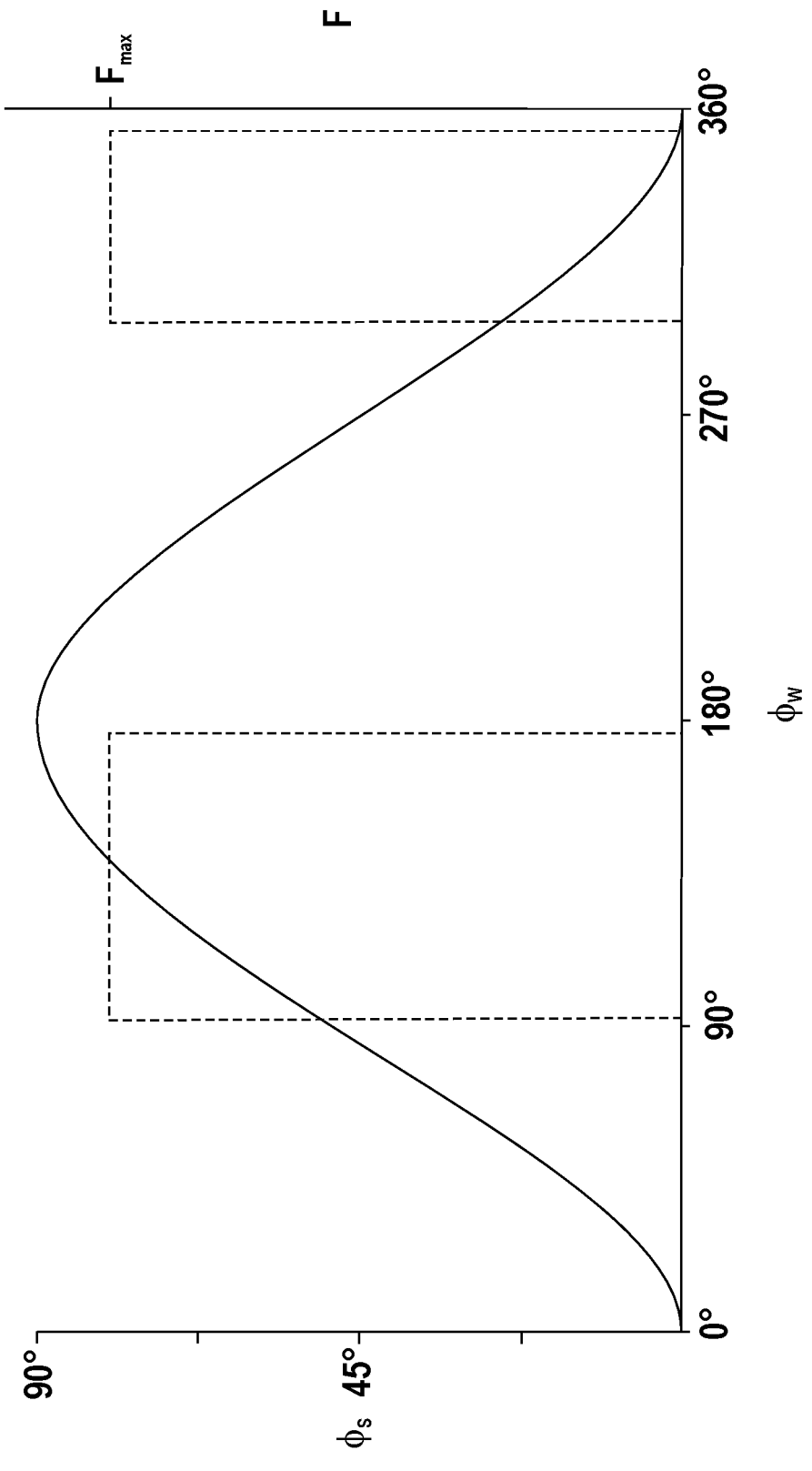
FIG. 5 shows a graph which illustrates the relationship between a rotation angle of a control shaft and a pivot angle of a needle rocker and a braking force.

The sensor element 30 cooperates with a curved path 25, which is connected to the control shaft 20 in a rotationally secure manner. The sensor element 30, the curved path 25 and the directional control valve 32 belong to a coupling mechanism 24 by means of which the brake apparatus 15 is coupled to the control shaft 20. The curved path 25 has two protruding regions 26. When one of the protruding regions 26 reaches the sensor element 30 during the rotation of the control shaft 20, it is deflected from its rest position and relieves the pressure on the directional control valve 32 so that it isolates the brake line 35 from the main line 34 and deactivates the disc brakes 16. Such a state is shown in FIG. 2. Consequently, the activation of the disc brakes 16 via the control shaft 20 is coupled to the movements of the needle rocker 11. That is to say, the braking force F is activated or deactivated in accordance with a respective phase of the binding cycle. This can be seen in FIG. 5, which, on the one hand, shows the path of a pivot angle $\Phi_S$ (continuous line) of the needle rocker 11 and, on the other hand, shows a path of the braking force F (broken line) depending on a rotation angle $\Phi_W$ of the control shaft. The dead center positions correspond to a pivot angle $\Phi_S$ of 0° and 90° and are, in this example, reached at rotation angles $\Phi_W$ of 0° and 180°. The position of the protruding regions 26 of the curved path 25 is selected in such a manner that the braking force F is activated in each case before reaching a dead center position and is deactivated again when or shortly before reaching the dead center position. The braking force F thus remains initially deactivated from a rotation angle of $\Phi_W$ of from 0° to approximately in accordance with a pivot angle $\Phi_S$ between 0° and approximately 50°. FIG. 2 corresponds in this instance to a pivot angle $\Phi_S$ of approximately 5°, thus shortly after leaving the bottom dead center position. A first braking phase is then carried out at a rotation angle $\Phi_W$ of from 95° to approximately 175° in accordance with a pivot angle $\Phi_S$ of from approximately 50° to approximately 87°, that is to say, shortly before the top dead center position. During this first braking phase, braking is carried out with a maximum braking force Fmax. FIG. 3 corresponds in this instance to a pivot angle $\Phi_S$ of approximately 80°, that is to say, shortly before reaching the top dead center position. Subsequently, the braking force F is again deactivated at a rotation angle $\Phi_W$ of from approximately 175° to approximately 300°. In this time, the pivot angle $\Phi_S$ increases from approximately 87° to 90° and falls again to approximately 27°. A second braking phase is then carried out at a rotation angle $\Phi_W$ of from 300° to approximately 355° in accordance with a pivot angle $\Phi_S$ approximately 27° and approximately 2°, that is to say, shortly before the bottom dead center position. During this second braking phase, braking is again carried out with a maximum braking force Fmax. In this manner, the braking force F supports the controlled reaching of the dead center position but does not impede the acceleration of the needle rocker 11 during the movement out of the dead center position. Optionally, between the directional control valve 32 and the return line 36, a secondary throttle 39 may be provided, whereby the pressure drop in the brake line 35 is slowed when the connection to the main line is interrupted.

Since the pressure p produced in the main line 34 and, with a corresponding connection, in the brake line 35 is proportional to the square of the speed n of the drive 40, this also applies to the braking force F when the disc brakes 16 are activated, more specifically the maximum braking force Fmax. Since, on the other hand, the needle rocker 11 is coupled to the drive 20 via the control shaft 20 during the binding cycle, the speed thereof is proportional to the speed n, and the necessary acceleration and deceleration forces increase with the square of the speed n. Consequently, the increase of the pressure p ensures with increasing speed n an appropriate increase of the braking forces F.

Since, with the binding apparatus 10 according to the invention, the braking force F is adapted with regard to its action to the respective phase of the binding cycle and is adapted with regard to its strength to the speed n of the drive or the cycle time of the binding cycle, on the one hand, a secure guiding of the needle rocker 11 is ensured, whilst, on the other hand, unnecessary energy consumption and wear of the brake apparatus 15 are prevented. Since the braking force acts only temporarily and in a selective manner, the needle rocker 11 can be accelerated more effectively. This means, for example, that the top dead center position can be reached precisely when the bale of harvested material is compressed to the maximum extent by the pressing piston 4. Consequently, the bale of harvested material can have optimum density during binding.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| | List of Reference Characters |
| --- | --- |
| 1 | Baling press |
| 2 | Frame |
| 3 | Pressing channel |
| 4 | Pressing Piston |
| 5 | Coupling gear mechanism |
| 10 | Binding apparatus |
| 11 | Needle rocker |
| 12 | Six binding needles |
| 13 | Rocker carrier |
| 15 | Brake apparatus |
| 16 | Two disc brakes |
| 17 | Brake disc |
| 18 | Brake caliper |
| 20 | Control shaft |
| 21 | Drive element |
| 22 | Coupling rod |
| 24 | Coupling mechanism |
| 25 | Curved path |
| 26 | Two protruding regions |
| 30 | Sensor element |
| 31 | First resilient element |
| 32 | Directional control valve |
| 33 | Second resilient element |
| 34 | Main line |
| 35 | Dividing brake line |
| 36 | Return line |
| 37 | Pump |
| 38 | Primary throttle |
| 39 | Secondary throttle |
| 40 | Motorized drive |
| A | Longitudinal channel axis |
| B | Rocker pivot axis |
| C | First coupling pivot axis |
| D | Second coupling pivot axis |
| E | Rotation axis |

TABLE 1-continued

| | List of Reference Characters |
| --- | --- |
| F | Braking force |
| p | Pressure |
| n | Speed |
| $\Phi_S$ | Pivot angle |
| $\Phi_W$ | Rotation angle of the control shaft. |
| Fmax | Maximum braking force |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A binding apparatus (10) for a baling press (1) comprising of:

a needle rocker (11) having a plurality of binding needles (12) for supplying a binding means to a pressing channel (3), wherein the needle rocker (11) can be driven by means of a motorized drive (40) in such a manner that it moves relative to a frame (2) of the baling press (1) in accordance with a binding cycle; and a brake apparatus (15), which is configured to apply a braking force (F) that acts at least indirectly on the needle rocker (11), wherein the binding apparatus (10) is configured in such a manner that the braking force (F) is automatically varied in accordance with at least one parameter relating to the binding apparatus (10);

wherein the binding apparatus (10) is configured that the braking force (F) is varied in accordance with a drive speed (n) of the drive (40); and wherein the braking force (F) increases with increasing drive speed (n).

2. The binding apparatus (10) for a baling press (1) according to claim 1, wherein the brake apparatus (15) can be hydraulically actuated.

3. The binding apparatus (10) for a baling press (1) according to claim 1, wherein the binding apparatus (10) is configured such that the braking force (F) is varied in accordance with a phase of the binding cycle.

4. The binding apparatus (10) for a baling press (1) according to claim 1, wherein the binding apparatus (10) is configured to activate the braking force (F) for at least one braking phase and to reduce the braking force (F) to zero after the braking phase.

5. The binding apparatus (10) for a baling press (1) according to claim 1, wherein the binding apparatus (10) is configured to introduce at least one braking phase before a dead center position of the needle rocker (11) is reached and to terminate it at the latest after the dead center position has been reached.

6. The binding apparatus (10) for a baling press (1) according to claim 1, wherein the brake apparatus (15) is coupled by means of a coupling mechanism (24) to a control shaft (20), which can be rotated relative to the frame (2) and via which the needle rocker (11) is coupled in a force-transmitting manner to the drive (40) at least during a binding cycle.

7. The binding apparatus (10) for a baling press (1) according to claim 6, wherein the coupling mechanism (24) has a curved path (25) which is connected in a rotationally secure manner to the control shaft (20) and a sensor element (30) which can be deflected by means of the curved path (25) with respect to the frame (2) and by means of the deflection of which the braking force (F) can be varied.

8. The binding apparatus (10) for a baling press (1) according to claim 7, wherein the sensor element (30) is coupled to a hydraulic valve (32), by means of which the brake apparatus (15) can be actuated.

9. The binding apparatus (10) for a baling press (1) according to claim 2, wherein a hydraulic pressure increases with increasing drive speed (n) in order to actuate the brake apparatus (15).

10. The binding apparatus (10) for a baling press (1) according to claim 1, wherein the brake apparatus (15) has a disc brake (16) having a brake caliper (18) which is suspended on the frame (2) and having a brake disc (17) which is coupled in a force-transmitting manner to the needle rocker (11).

11. The binding apparatus (10) for a baling press (1) according to claim 10, further comprising a brake liner which is arranged on the brake caliper (18), can be moved with respect to the frame (2) with at least one degree of freedom.

12. A baling press (1), having a binding apparatus (10) comprising:

a needle rocker (11) having a plurality of binding needles (12) for supplying a binding means to a pressing channel (3), wherein the needle rocker (11) can be driven by means of a motorized drive (40) in such a manner that it moves in accordance with a binding cycle relative to a frame (2) of the baling press (1);

a brake apparatus (15), which is configured to apply a braking force (F) that acts at least indirectly on the needle rocker (11), wherein the binding apparatus (10) is configured in such a manner that the braking force (F) is automatically varied in accordance with at least one parameter which relates to the binding apparatus (10)

wherein the binding apparatus (10) is configured that the braking force (F) is varied in accordance with a drive speed (n) of the drive (40); and wherein the braking force (F) increases with increasing drive speed (n).

* * * * *